United States Patent [19]
Monnin

[11] Patent Number: 5,852,493
[45] Date of Patent: Dec. 22, 1998

[54] SELF-ALIGNING LASER TRANSMITTER HAVING A DUAL SLOPE GRADE MECHANISM

[75] Inventor: Douglas Bernard Monnin, Dayton, Ohio

[73] Assignee: Spectra Precision, Inc., Dayton, Ohio

[21] Appl. No.: 815,623

[22] Filed: Mar. 13, 1997

[51] Int. Cl.$^6$ ............................. G01B 11/26; G01C 05/00
[52] U.S. Cl. ........................................... 356/141.1; 33/291
[58] Field of Search ............................. 356/141.1, 141.3, 356/141.5, 137.1, 148, 147; 33/291

[56] References Cited

U.S. PATENT DOCUMENTS

| | | |
|---|---|---|
| 4,035,084 | 7/1977 | Ramsay . |
| 4,062,634 | 12/1977 | Rando et al. . |
| 4,221,483 | 9/1980 | Rando . |
| 4,519,705 | 5/1985 | Morrow . |
| 4,629,321 | 12/1986 | Hart et al. . |
| 5,033,847 | 7/1991 | Hamblin et al. . |
| 5,076,690 | 12/1991 | deVos et al. . |
| 5,485,266 | 1/1996 | Hirano et al. . |
| 5,606,802 | 3/1997 | Ogawa ........................................ 33/276 |
| 5,636,018 | 6/1997 | Hirano et al. ............................ 356/248 |
| 5,655,307 | 8/1997 | Ogawa et al .............................. 33/291 |

*Primary Examiner*—Mark Hellner
*Attorney, Agent, or Firm*—Killworth, Gottman, Hagan & Schaeff, L.L.P.

[57] ABSTRACT

A self-aligning laser transmitter having a dual slope grade mechanism is provided. The laser transmitter includes a light source coupled to a frame which is suspended from a gimbal mechanism. The gimbal mechanism and the frame are coupled to a rotatable base. X and Y axes leveling devices are coupled to the gimbal mechanism and the frame to level the light source. A grade arm having two level sensors mounted at ninety degrees to one another is coupled to the frame. The grade arm is pivoted along the X or Y axes by a grade arm pivoting device. The X and Y axes leveling devices reposition the light source so that the level sensors are level thereby introducing a slope to the light source corresponding to the amount of pivot of the grade arm. The base may be rotated for a dual slope capability. The laser transmitter may be self-aligned automatically by aligning the laser transmitter with a target positioned at a reference location. A digital processor may be used to control the rotating device so that the laser transmitter is automatically aligned with the target. The digital processor may control a directional indicator which indicates a direction to rotate the laser transmitter so that the laser transmitter is manually aligned with the target.

39 Claims, 5 Drawing Sheets

SELF-ALIGNING LASER TRANSMITTER HAVING A DUAL SLOPE GRADE MECHANISM

BACKGROUND OF THE INVENTION

The present invention generally relates to a laser beam projection device and, in particular, to an arrangement for permitting control of the orientation of a rotating laser beam.

Laser light systems have been employed in numerous surveying and construction applications. In one such system, a laser light transmitting device provides a rotating laser beam which establishes a reference plane. Typically, the rotating laser beam is used to provide a continuous plane of light that creates either a constant horizontal bench mark of elevation or a selected slope over an entire work area. The laser light is either detected by the naked eye or by one or more laser beam detectors, placed at considerable distances from the transmitting device. Various construction tasks are performed based on the visual perception of the laser light, while the detectors are used to intercept the rotating laser beam and determine a proper elevation and grade at selected points throughout the work area.

In the laser light transmitting device, the plane of light is produced by projecting the beam generally upward and then deflecting the beam ninety degrees within a pentaprism or pentamirror assembly. The pentaprism assembly is rotated about a vertical axis within the transmitting device to cause the beam to rotate and define the reference plane. The plane of light may be tilted to the desired slope by offsetting the laser light transmitting device with respect to a generally horizontal plane.

Manual systems have been used to set the desired slope. The laser light transmitting device is first tilted along one axis and then rotated about the vertical axis to achieve the desired slope. The amount of tilt and rotation are determined by complex tables. Such systems are disadvantageous in that their accuracies are dependent, in part, upon the skill of the operator in the initial adjustment and orientation of the systems. Moreover, the desired slope is difficult to duplicate after the initial setting.

Systems have been used to orient the plane of light automatically. For example, U.S. Pat. No. 4,629,321, issued Dec. 16, 1986, to Hart et al., discloses a system for automatically leveling the plane of light with respect to the horizontal and then orienting the plane of light at an angle with the horizontal. A support frame for the laser source is pivotally mounted on the base frame. An L-shaped leveling device is pivotally supported at one point by the support frame and carries electrical sensor vials which sense the orientation of the leveling device. The vials provide electrical signals used by a feedback control system. The control system actuates electric motors to move the leveling device and the support frame into a position in which the vials are leveled. Assuming the system is calibrated and set for zero grade, the support frame and the leveling device will be horizontal with a high degree of accuracy. When the plane of light is to be oriented at an angle with respect to the horizontal, the leveling arm is tilted to the desired angle with respect to the support frame. The control system then reorients the leveling device and the support frame to bring the vials back into a level position, thus tilting the support frame by the desired angle. The L-shape leveling device is disadvantageous because it requires a large area to pivot and permits limited tilting of the plane of light. Further, misalignment of the plane of light frequently occurs because the leveling device tends to slip at the pivot point as the L-shape leveling device tilts, causing one or both of the vials to skew slightly from the measurement axis.

Other prior art leveling devices include the use of two independent bars coupled to the support frame. Each bar includes a vial and rotates with respect to a corresponding measurement axis. Each bar is independently tilted to the desired angle. The support frame and bars are then reoriented to bring the vials back into a level position, thus tilting the support frame by the desired angle. However, as the independent bars are rotated, the vials tend to roll from a nominal upright position, causing misalignment of the plane of light. Further, none of the prior art devices provide an automatic system for consistently aligning the plane of light.

Accordingly, there is a need for an accurate and automatic system for controlling the orientation of a rotating laser beam.

SUMMARY OF THE INVENTION

The present invention meets the aforementioned needs by providing a system for controlling the orientation of a rotating laser beam generated by a laser transmitter which is automatic and accurate.

According to a first aspect of the present invention, an apparatus for projecting laser light in a plane having predetermined slopes with respect to an X-axis and with respect to a Y-axis, the Y-axis being orthogonal to the X-axis, comprises a housing, a base rotatably coupled to the housing, a gimbal mechanism coupled to the base and adapted for pivotal movement about the X-axis, a frame coupled to the gimbal mechanism and adapted for pivotal movement along the Y-axis, an optical device coupled to the frame and including a light source to generate the laser light which rotates about a first axis and an optical projecting device to project the laser light in the plane which is orthogonal to the first axis, an X-axis leveling device coupled to the gimbal mechanism to control an angular orientation of the gimbal mechanism about the X-axis with respect to a Z-axis, the Z-axis being substantially orthogonal to the X and Y axes, a Y-axis leveling device coupled to the gimbal mechanism and the frame to control an angular orientation of the frame about the Y-axis with respect to the Z-axis, a grade arm rotatably coupled to the frame and including a first level sensor adapted to sense the angular orientation of the gimbal mechanism and a second level sensor adapted to sense the angular orientation of the frame, a grade arm pivoting device coupled to the grade arm to control a predetermined angular orientation of the grade arm with respect to one of the X or Y axes, a rotating device coupled to the base to adjust an angular orientation of the base with respect to a reference axis, the base being rotated about the Z-axis, and a processor programmed to set the predetermined angular orientation of the grade arm and the angular orientation of the base based on the predetermined slopes. The processor is adapted to control the X-axis leveling device and the Y-axis leveling device so that the first and second level sensors are substantially level and the plane of light has the predetermined slopes.

Preferably, the grade arm is substantially straight. The base may include a position measuring device to measure the angular position of the base with respect to the reference axis. The position measuring device is preferably a rotary encoder. The apparatus may further comprise a reflective target that is positioned at a desired location from the apparatus. The optical device includes a photodetecting system to detect the laser light reflected from the reflective target and to generate a signal representative of the location.

The processor is adapted to receive the signal and programmed to control said rotating device so that the reference axis is substantially parallel with a line defined by the apparatus and the target.

Preferably, the predetermined slopes are inputted by a user into the processor. The photodetecting system may include an optical encoder. The reflective target may comprise a retroreflector. Preferably, the base includes a first gearing mechanism, the rotating device includes a second gearing mechanism in engagement with the first gearing mechanism and a motor coupled to the second gearing mechanism. The grade arm pivoting device may include a leadscrew nut coupled to the grade arm, a leadscrew threadly engaged with the leadscrew nut, and a motor coupled to the leadscrew. Preferably, a range of rotation of the grade arm is about ±45 degrees.

According to another aspect of the present invention, an apparatus for projecting laser light in a plane having predetermined slopes with respect to an X-axis and with respect to a Y-axis, the Y-axis being substantially orthogonal to the X-axis, comprises a base, a gimbal mechanism coupled to the base and adapted for pivotal movement about the X-axis, a frame coupled to the gimbal mechanism and adapted for pivotal movement along the Y-axis, an optical device coupled to the frame and including a light source to generate the laser light which rotates about a first axis, an optical projecting device to project the laser light in the plane which is orthogonal to the first axis, and a photodetecting system, an X-axis leveling device coupled to the gimbal mechanism to control an angular orientation of the gimbal mechanism about the X-axis with respect to a Z-axis, the Z-axis being substantially orthogonal to the X and Y axes, a Y-axis leveling device coupled to the gimbal mechanism and the frame to control an angular orientation of the frame about the Y-axis with respect to the Z-axis, a grade arm rotatably coupled to the frame and including a first level sensor adapted to sense the angular orientation of the gimbal mechanism and a second level sensor adapted to sense the angular orientation of the frame, a grade arm pivoting device coupled to the grade arm to control a predetermined angular orientation of the grade arm with respect to one of the X or Y axes, a reflective target that is positioned at a desired location from the apparatus, a directional indicator, and a processor. The photodetecting system detects reflected laser light from the reflective target and generates a signal representative of the location. The processor is adapted to receive the signal and programmed to set the predetermined angular orientation of the grade arm and to control the directional indicator to indicate a direction to rotate the base about the Z-axis so that the plane of light has the predetermined slopes.

Preferably, the directional indicator indicates a direction to rotate the base based on the signal so that a reference axis is substantially parallel with a line defined by the apparatus and the target. The processor may be adapted to control the directional indicator to indicate a direction to rotate the base with respect to the reference axis so that the plane of light has the predetermined slopes. The grade arm is preferably substantially straight. The predetermined slopes may be inputted by a user into the processor. The photodetecting system may include an optical encoder. The reflective target preferably comprises a retroreflector. The grade arm pivoting device may include a leadscrew nut coupled to the grade arm, a leadscrew threadly engaged with the leadscrew nut, and a motor coupled to the leadscrew. A range of rotation of the grade arm is preferably about ±45 degrees.

According to yet another aspect of the present invention, an automated process for projecting laser light in a plane having predetermined slopes with respect to an X-axis and with respect to a Y-axis, the Y axis being orthogonal to the X-axis, comprising the steps of: projecting the laser light from a light source along a first axis, directing the laser light along the plane which is orthogonal to the first axis, positioning the light source at a first angle with respect to one of the X and Y axes, rotating the light source a set number of degrees about a Z-axis with respect to a reference axis, the Z-axis being substantially orthogonal to the X and Y axes, and calculating the first angle and the set number of degrees based on the predetermined slopes using a digital processor.

Preferably, the predetermined slopes are inputted by a user into the digital processor. The step of rotating the light source may include rotating a base with respect to a housing, the base being coupled to a gimbal mechanism which is adapted for pivotal movement about the X-axis, the gimbal mechanism being coupled to a frame which is adapted for pivotal movement about the Y-axis, and the light source being coupled to the frame. The step of rotating the light source may include using a rotary encoder to measure the set number of degrees from the reference axis. The step of positioning the light source may include tilting a grade arm which is rotatably coupled to the light source to the first angle, the grade arm including a first level sensor adapted to sense an angular orientation of the light source about the X-axis with respect to the Z-axis and a second level sensor adapted to sense an angular orientation of the light source about the Y-axis with respect to the Z-axis, the position of the light source being adjusted so that the first and second level sensors are substantially level and the plane of light has the predetermined slopes. Preferably, the grade arm is substantially straight.

According to yet another aspect of the present invention, a process for projecting laser light in a plane having predetermined slopes with respect to an X-axis and with respect to a Y-axis, the Y-axis being orthogonal to the X-axis, comprises the steps of: projecting the laser light from a light source along a first axis, directing the laser light along the plane which is orthogonal to the first axis, positioning a reflective target at a desired location, detecting laser light reflected from the reflective target and generating a signal representative of the location, and positioning the light source based on the signal so that the plane of light has the predetermined slopes.

Preferably, the step of positioning the light source includes rotating the light source so that a reference axis is substantially parallel with a line defined by the light source and the target. The step of positioning the light source includes positioning the light source at a first angle with respect to one of the X and Y axes. The step of positioning the light source at the first angle with respect to one of the X and Y axes may include tilting a grade arm which is rotatably coupled to the light source at the first angle, the grade arm including a first level sensor adapted to sense an angular orientation of the light source about the X-axis with respect to a Z-axis and a second level sensor adapted to sense an angular orientation of the light source about the Y-axis with respect to the Z-axis, the Z-axis being substantially orthogonal to the X and Y axes, the position of the light source is adjusted so that the first and second level sensors are substantially level and the plane of light has the predetermined slopes. The step of positioning the light source may include rotating a base a set number of degrees about the Z-axis with respect to the reference axis, the base being coupled to a gimbal mechanism which is adapted for pivotal movement about the X-axis, the gimbal mechanism coupled to a frame which is adapted for pivotal movement about the Y-axis, and the light source is coupled to the frame. The grade arm is preferably substantially straight.

According to yet another aspect of the present invention, a process for projecting laser light in a plane having predetermined slopes with respect to an X-axis and with respect to a Y-axis, the Y-axis being orthogonal to the X-axis, comprises the steps of: projecting the laser light from a light source along a first axis, directing the laser light along the plane which is orthogonal to the first axis, positioning a reflective target at a desired location, detecting laser light reflected from the reflective target and generating a signal representative of the location, positioning the light source at a first angle with respect to one of the X and Y axes, indicating a direction to rotate the light source, the light source being rotated about a Z-axis, the Z-axis being substantially orthogonal to the X and Y axes, and calculating the first angle and the direction so that the plane of laser light has the predetermined slopes.

Preferably, the step of indicating a direction to rotate the light source includes indicating a direction to rotate the light source based on the signal so that a reference axis is substantially parallel with a line defined by the apparatus and the target. The step of indicating a direction to rotate the light source includes indicating a direction to rotate the light source with respect to the reference axis so that the plane of light has the predetermined slopes. The step of indicating a is direction to rotate the light source may include rotating a base, the base being coupled to a gimbal mechanism which is adapted for pivotal movement about the X-axis, the gimbal mechanism being coupled to a frame which is adapted for pivotal movement about the Y-axis, and the light source being coupled to the frame. The step of positioning the light source may include tilting a grade arm which is rotatably coupled to the light source at the first angle, the grade arm including a first level sensor adapted to sense an angular orientation of the light source about the X-axis with respect to the Z-axis and a second level sensor adapted to sense an angular orientation of the light source about the Y-axis with respect to the Z-axis, the position of the light source being adjusted so that the first and second level sensors are substantially level and the light source has the predetermined slopes. Preferably, the grade arm is substantially straight.

DETAILED DESCRIPTION OF THE PREFERRED EMBODIMENTS

Figure 1:
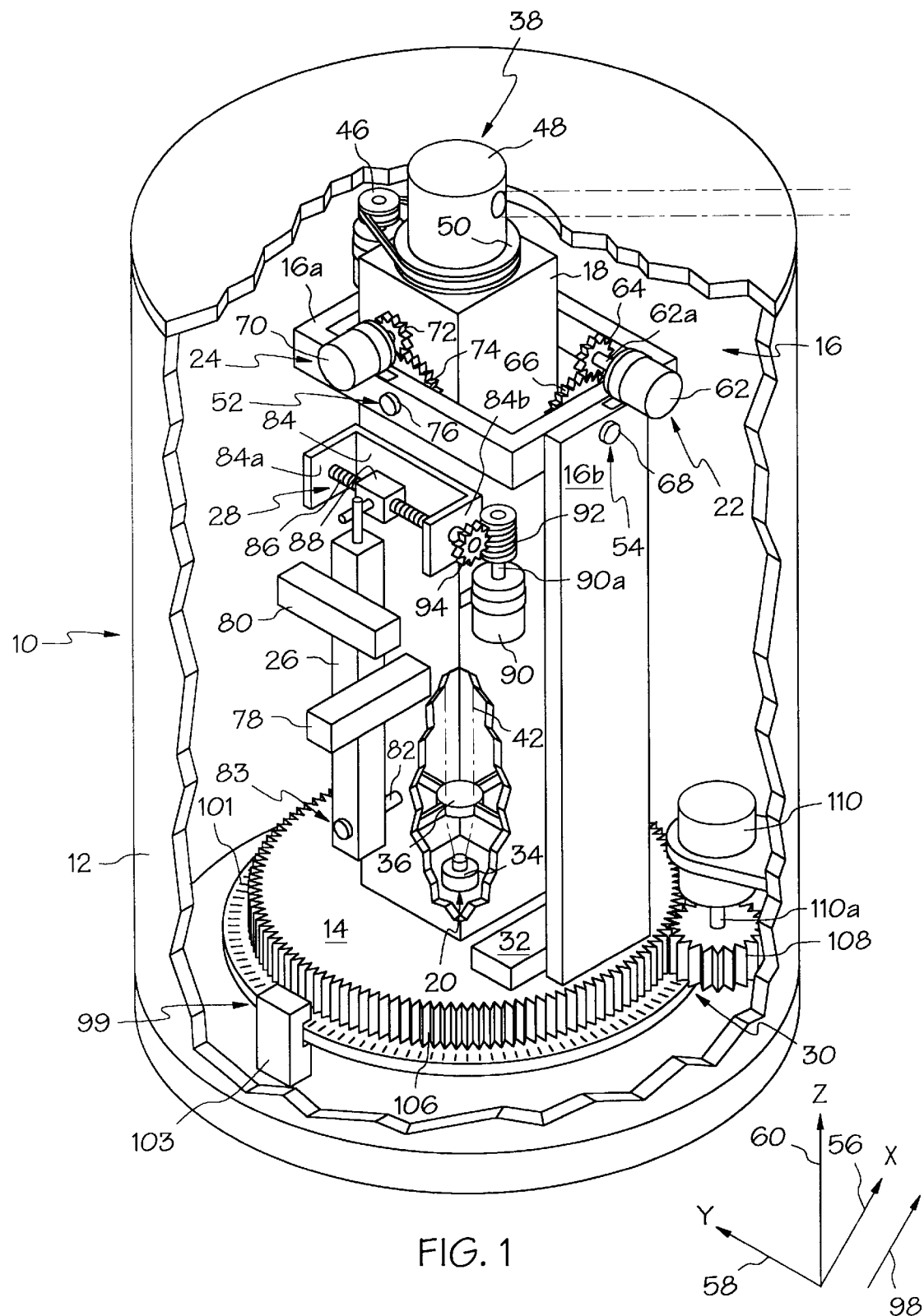
FIG. 1 is a perspective view of a laser transmitter according to the present invention.

Referring now to FIG. 1, a laser transmitter 10 according to the present invention is shown. The laser transmitter 10 includes a housing 12, a base 14, a gimbal mechanism 16, a frame 18, an optical device 20, an X-axis leveling device 22, a Y-axis leveling device 24, a grade arm 26, a grade arm pivoting device 28, a rotating device 30 and a digital processor 32. The optical device 20 includes a light source 34, a collection lens 36, and an optical projecting device 38.

The light source 34 is coupled to the frame 18. The light source 34 is preferably a laser diode which generates a beam of laser light 42 in a first direction upwards along the plane of the page. The collection lens 36 is coupled to the frame 18 and is positioned above the light source 34. The collection lens 36 serves to collect the laser light 42 and project it along a first axis. Preferably, the collection lens 36 is a planar convex lens which collimates the laser beam 42.

The optical projecting device 38 is coupled to the frame 18 and includes a motor 46 and a pentaprism 48 within a spindle 50. The optical projecting device 38 is positioned above the collection lens 36 to deflect the laser beam 42 ninety degrees with respect to vertical. The pentaprism 48 is a structure which deflects light at a ninety degree angle with respect to the direction of the incoming light, regardless of the incident angle of the incoming light on the pentaprism 48. Consequently, the incoming light does not have to hit the pentaprism 48 at an exact location in order to be deflected ninety degrees. The pentaprism 48 is rotated within the spindle 50 by the motor 46 to define a generally horizontal plane of light. As will be appreciated by those skilled in the art the pentaprism 48 may have any reasonable angular velocity. It will be appreciated by those skilled in the art that other light deflecting devices, such as a pentamirror, mirror, prism, reflector or refractor, may be used without departing from the scope of the present invention. It will be further appreciated by those skilled in the art that the position of the light source 34, the collection lens 36 and the optical projecting device 38 may be reversed so that the laser light 42 is projected downwards towards the pentaprism 48. It will be even further appreciated by those skilled in the art that laser light 42 may be projected sidewalls and then deflected towards the pentaprism 48.

The frame 18 is coupled to a first portion 16a of the gimbal mechanism 16 through a Y-axis leveling pivot 52. The first portion 16a is coupled to a second portion 16b of the gimbal mechanism 16 through an X-axis leveling pivot 54. An X-axis 56, a Y-axis 58 and a Z-axis 60 are defined as shown in FIG. 1, with the Y-axis 58 being orthogonal to the X-axis 56 and the Z-axis 60 being orthogonal to the X and Y axes 56, 58. The second portion 16b of the gimbal mechanism 16 is coupled to the base 14 so that the frame 18 is suspended by the gimbal mechanism 16. Since the frame 18 is suspended from the gimbal mechanism 16, the frame 18 pivots about the X and Y axes 56, 58 via the X and Y axes leveling pivots 54, 52, respectively. The angular orientation of the frame 18 with respect to the X and Y axes, and hence the laser beam 42, is dependent on the orientation of the first portion 16a with respect to the second portion 16b of the gimbal mechanism 16, and the orientation of the frame 18 with respect to the first portion 16a of the gimbal mechanism 16, respectively.

The X-axis leveling device 22 is coupled to the first and second portions 16a, 16b of the gimbal mechanism 16. The X-axis leveling device 22 includes a first motor 62, a first gear 64, a second gear 66, and a first shaft 68. The second gear 66 is coupled to the first portion 16a of the gimbal mechanism 16 using conventional fasteners (not shown) while the first shaft 68 is coupled to the second gear 66 and the second portion 16b through the X-axis leveling pivot 54. The first shaft 68 rotates within the X-axis leveling pivot 54 so that as the second gear 66 rotates, the first portion 16a of the gimbal mechanism 16 rotates with respect to the second portion 16b of the gimbal mechanism 16. The first gear 64 is coupled to a shaft 62a of the first motor 62. The teeth on the first gear 64 correspond to and engage the teeth on the second gear 66 such that as the first motor 62 rotates the first gear 64, the second gear 66 rotates which effectuates rotation of the first portion 16a of the gimbal mechanism 16, and hence the frame 18, with respect to the second portion 16b of the gimbal mechanism 16. Accordingly, the frame 18 and the laser beam 42 rotate about the X-axis 56 with respect to the Z-axis 60.

The Y-axis leveling device 24 is coupled to the first portion 16a of the gimbal mechanism 16 and the frame 18. The Y-axis leveling device includes a second motor 70, a third gear 72, a fourth gear 74, and a second shaft 76. The fourth gear 72 is coupled to the frame 18 through conventional fasteners (not shown) while the second shaft 76 is coupled to the fourth gear 72 and the first portion 16a of the gimbal mechanism 16 through the Y-axis leveling pivot 52. The second shaft 76 rotates within the Y-axis leveling pivot 52 so that as the third gear 72 rotates, the frame 16 rotates with respect to the first portion 16a of the gimbal mechanism. The third gear 72 is coupled to a shaft 70a of the motor 70. The teeth on the third gear 72 correspond to and engage the teeth on the fourth gear 74 such that as the second motor 70 rotates the third gear 72, the fourth gear 74 rotates which effectuates rotation of the frame 18. Accordingly, the frame 18 and the laser beam 42 rotate about the Y-axis 58 with respect to the Z-axis 60.

It will be appreciated by those skilled in the art that the X and Y-axis leveling devices 22, 24 may effectuate rotation of the frame 18 through other conventional gearing schemes. It will be further appreciated by those skilled in the art that belt drive systems or direct drive systems may be used to rotate the frame 18 without departing from the scope of the present invention.

The light source 34 is leveled with respect to the X and Y axes 56, 58 through the grade arm 26. The grade arm 26 includes a first level sensor 78, a second level sensor 80, and a grade arm pivot shaft 82. The grade arm 26 is pivotally coupled to the frame 18 through the grade arm pivot shaft 82 which engages a grade arm pivot 83. The first and second level sensors 78, 80 are coupled to the grade arm 26 such that the first level sensor 78 senses the angular orientation of the gimbal mechanism 16 about the X-axis 56 while the second level sensor 80 senses the angular orientation of the frame 18 about the Y-axis 58. According to the illustrated embodiment, the grade arm 26 is substantially straight, with the first and second level sensors 78, 80 mounted 90 degrees relative to one another. Consequently, with the frame 18 plumb with respect to the ground (i.e. vertical), the grade arm 26 is parallel to the Z-axis 60, the first level sensor 78 is parallel to the X-axis 56 and the second level sensor 80 is parallel to the Y-axis 58. The Z-axis 60 is also parallel to the first axis 44 such that laser beam 12 defines a horizontal plane of light with zero degrees of slope along both the X and Y axes 56, 58.

The grade arm pivoting device 28 may be used to adjust the relative position of the grade arm 26, thereby adjusting the relative orientation of the laser beam 12. The grade arm pivoting device 28 includes a grade arm pivoting device housing 84, a leadscrew 86, a leadscrew nut 88, a grade arm motor 90, a fifth gear 92, and a sixth gear 94. The grade arm pivoting device housing 84 is coupled to the frame 18. The leadscrew 86 is coupled to the grade arm pivoting device housing 84. The leadscrew nut 86 includes internal threads which correspond to and engage external threads of the leadscrew 86. The leadscrew nut 88 translates back and forth between a first portion 84a and a second portion 84b of the grade arm pivoting device housing 84. The leadscrew nut 88 is coupled to the grade arm 26 such that the grade arm 26 pivots about the grade arm pivot 83 as the leadscrew nut 88 translates back and forth. The fifth gear 92 is coupled to the leadscrew 86 and has gear teeth which correspond to and engage the gear teeth of the sixth gear 94. The sixth gear 94 is coupled to a shaft 90a of the leadscrew motor 90 such that as the leadscrew motor 90 rotates the sixth gear 94, the fifth gear 92 rotates which rotates the leadscrew 86 causing the leadscrew nut 88 to translate. It will be appreciated by those skilled in the art that other conventional gearing schemes and/or drive systems may be used to pivot the grade arm 26.

Figure 2:
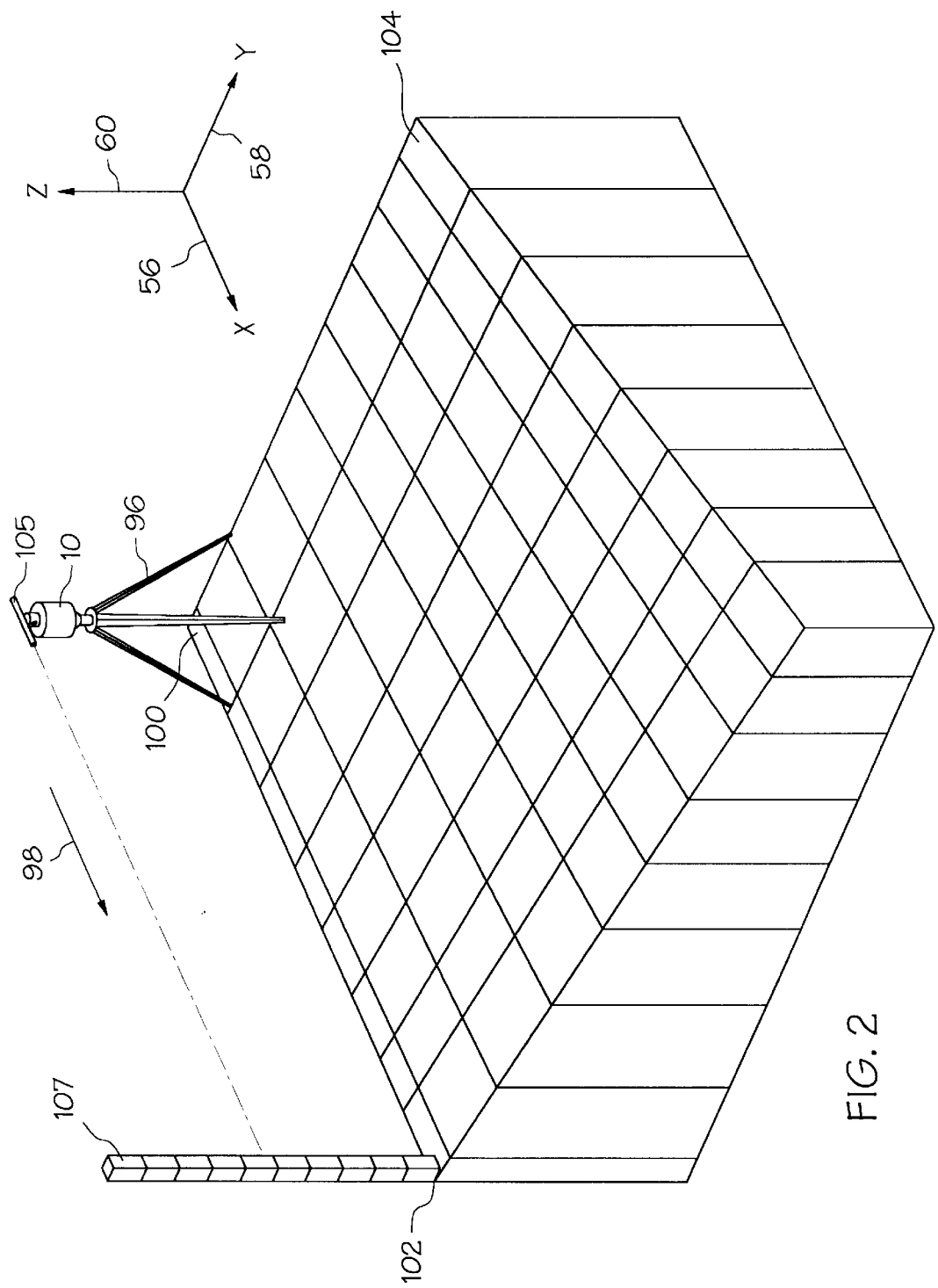
FIG. 2 is a schematic perspective view illustrating a field setup of the laser transmitter of FIG. 1.

The first and second level sensors 78, 80 generate leveling signals which are transmitted to the digital processor 32. The digital processor 32 is programmed to control the X and Y-axis leveling devices 22, 24 so that the first and second level sensors 78, 80 are level. As shown in FIG. 2, the laser transmitter 10 is positioned on top of a tripod 96 which is roughly leveled. The grade arm pivoting device 28 is set for zero slope so that the grade arm 26 is substantially parallel with the frame 18. The digital processor 32 adjusts the X and Y-axis leveling devices 22, 24 until the first and second level sensors 78, 80 are level. The frame 18 should be plumb so that the laser transmitter 10 generates a horizontal plane of laser light.

A slope may be added to the plane of laser light by pivoting the grade arm 26. As the X, Y and Z axes have been defined, pivoting of the grade arm 26 will cause the slope with respect to the Y-axis 58 to be generated. The present invention will be described according to the defined axes, although it should be apparent that the invention is not limited to the defined axes. The digital processor 32 will cause the grade arm pivoting device 28 to pivot the grade arm 26 based on the desired slope so that it has a predetermined angular orientation with respect to the Y-axis 58. Once the grade arm 26 has pivoted, the second level sensor 80 will be out of level by a set number of degrees based on the predetermined angular orientation. The digital processor 32 will adjust the Y-axis leveling device 24 until the second level sensor 80 is once again level. Once the second level sensor 80 is level, the frame 18 will be pivoted the same number degrees as the grade arm 26. The laser beam 12 will no longer project a horizontal plane of light but a plane of light having the desired slope.

Desired slopes with respect to the X-axis 56 and with respect to the Y-axis 58 may be achieved by rotating the base 14 with respect a reference or grade axis 98. The reference axis 98 is a calibration axis in which all slope calculations are referenced. Typically, the reference axis 98 is aligned with and then defined with respect to one of the axes of the laser transmitter 10, e.g. X-axis 56 or Y-axis 58. In the illustrated embodiment, the reference axis 98 will be aligned with and defined with respect to the X-axis 56, since the grade arm 26 rotates with respect to the Y-axis 58. Typically, as shown in FIG. 2, the laser transmitter 10 will be positioned at one corner of a jobsite, e.g. 100, which is the intersection of the desired slopes with respect to the X-axis 56 and with respect to the Y-axis 58. The housing 12, and hence the base 14, will be rotated until the reference axis 98 is aligned with one of the two adjoining edges of the jobsite, e.g. first edge 102 or second edge 104. Once the reference axis 98 is aligned, the laser transmitter 10 is calibrated so that a dual slope, i.e. a slope with respect to the X-axis 56 and a slope with respect to the Y-axis 58, may be applied to the jobsite.

As shown in FIG. 1, the base 14 is rotatably coupled to the housing 12 so that the base 14 rotates about the Z-axis 60.

The rotating device 30 is coupled to the base 14 to effectuate rotation of the base 14 about the Z-axis 60. The base 14 includes a first gearing mechanism 106 having teeth which correspond to and engage teeth on a second gearing mechanism 108 of the rotating device 30. The rotating device 30 includes a motor 110 having a shaft 110a coupled to the second gearing mechanism 108. The motor 110 rotates the second gearing mechanism 108 which causes rotation of the first gearing mechanism 106, hence the base 14. It will be appreciated by those skilled in the art that the rotating device 30 may effectuate rotation of the base 14 through other conventional gearing schemes. It will be further appreciated by those skilled in the art that belt drive systems or direct drive systems may be used to rotate the base 14 without departing from the scope of the present invention.

The base 14 includes a position measuring device 99. In the illustrated embodiment, the position measuring device 99 is an optical rotary encoder having an encoder disc 101 and a read head 103. The encoder disc 101 has graduations around the periphery of the disc which are read by the read head 103. The read head 103 includes an optical source (not shown) and an optical detector (not shown). The encoder disc 101 is positioned between the optical source and the optical detector so that as the encoder disc 101 rotates, the read head 103 generates a signal representative of the position of the encoder disc 101, and hence the base 14. As is well known in the art, the encoder disc 101 may contain graduations which are spaced in a manner so that each position around the disc is uniquely referenced. The encoder disc 101 may contain a reference mark graduation and a number of equally spaced graduations so that the position around the disc is referenced to the reference mark. In the illustrated embodiment, the encoder disc 101 has a reference mark (not shown) which is aligned with the X-axis 56 or the reference axis 98 so that the laser transmitter 10 is calibrated with respect to the reference axis 98. Once the base 14 is aligned with the reference axis 98, there is a set benchmark for rotating the base 14. It will be appreciated by those skilled in the art that other optical and non-optical position measuring devices may be used to determine the relative position of the base 14.

A dual slope may be generated by the laser transmitter 10 as follows, see FIG. 2. The apparatus 10 is positioned at the corner 100 of the job site. The laser transmitter 10 is reset so that the reference axis 98 is aligned with an optical scope 105. The optical scope 105 is mounted on top of the housing 12 in a set reference position. Once the laser transmitter 10 is reset, the reference axis 98 will correspond to the direction in which the optical scope 105 is pointing. Accordingly, as the optical scope 105 is sighted, the reference axis 98 will move with the housing 12 as the housing 12 is rotated. The housing 12 is rotated until the reference axis 98 is aligned with the first or second edge 102, 104. The housing 12 is aligned with the first or second edge 102, 104 by sighting the optical scope 105 with a surveyors rod 107 positioned along the first or second edge 102, 104. The housing 12 is rotated until the cross-hairs of the optical scope 105 are aligned with the surveyors rod 107. The housing 12 and the base 14, and thus the reference axis 98, are aligned with the first or second edge 102, 104 of the jobsite.

The operator inputs the desired X and Y axes slopes into the digital processor 32 through a keypad or grade dial (not shown). The digital processor 32 calculates the composite slope and the pivots the grade arm 26 so that the angular orientation of the grade arm 26 corresponds to the composite slope. The digital processor 32 also calculates the number of degrees to rotate the base 14 with respect to the reference axis 98 so that the laser transmitter 10 projects the laser light 42 with the predetermined slopes with respect to the X-axis 56 and with respect to the Y-axis 58. For example, a desired slope of 15 degrees along the X-axis 56 and a desired slope of 22 degrees along the Y-axis 58 corresponds to a composite slope of 25.86 degrees with a rotation of the laser transmitter 10 33.55 degrees. The grade arm 26 is pivoted 25.86 degrees along the Y-axis 56 and the base 14 is rotated 33.55 degrees with respect to the reference axis 98 to achieve the desired slope of 15 degrees along the X-axis 56 and 22 degrees along the Y-axis 58. The configuration the laser transmitter 10 allows the grade arm 26 to rotate approximately ±45 degrees without introducing error associated with some prior art devices as their level sensors roll from the nominal upright position. Tilting of the level sensors 45 degrees in some of the prior art device would introduce a significant error to the laser transmitting device.

Figure 3:
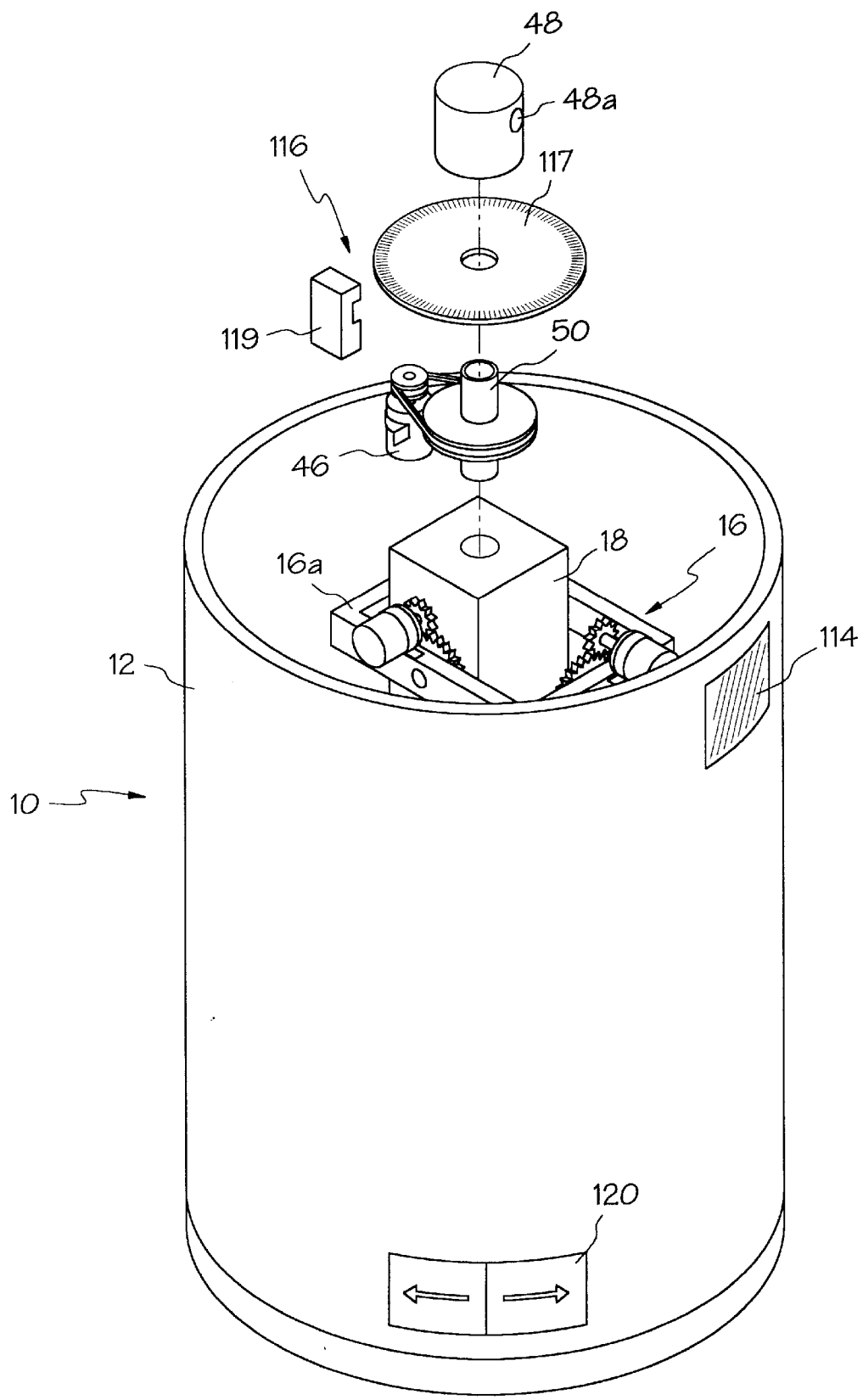
FIG. 3 is a schematic exploded perspective view illustrating a self-aligning feature according to one embodiment of the laser transmitter.
Figure 4:
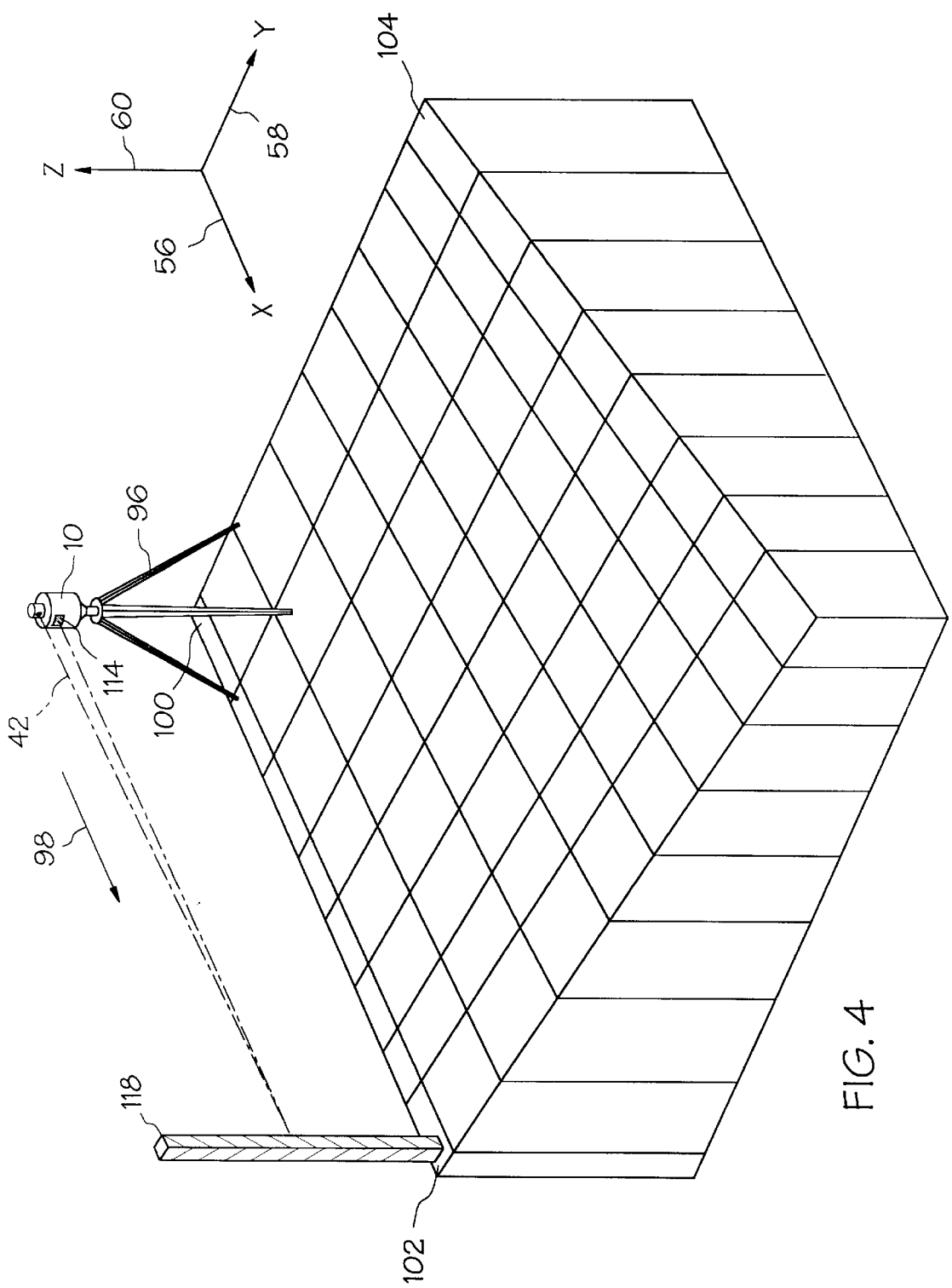
FIG. 4 is a schematic perspective view illustrating a field set-up of the laser transmitter with the self-aligning feature of FIG. 3.

Manually aligning the reference axis 98 with one of the edges 102, 104 of the jobsite is dependent, in part, on the skill of the operator, the skill of the operator's helper holding the surveyors rod 107, and the alignment of the optical scope 105 with the housing 12. Further, it is difficult to duplicate the alignment of the laser transmitter 10 precisely each time the laser transmitter 10 is used. The laser transmitter 10 may be self-aligned as follows. The laser transmitter 10 is positioned at the corner 100. As shown in FIG. 3, the optical device 20 may include a photodetecting system 112 comprising a photodetector 114 and an optical encoder 116. In the illustrated embodiment, the photodetector 114 is coupled to the housing 12 and the optical encoder 116 is coupled to the pentaprism 48. The optical encoder 116 is configured in the same manner as the position measuring device 99. The optical encoder 116 includes an encoder disc 117 positioned between an optical source (not shown) and an optical detector (not shown) of a read head 119. The read head 119 generates a signal indicative of the relative position of the encoder disc 117, and thus the pentaprism 48. In the illustrated embodiment, the encoder disc 117 includes a reference mark which is aligned with the exit opening 48a of the pentaprism 48. The laser transmitter 10 is self-aligned by placing a target 118 at a desired location; see FIG. 4. The target 118 is a retroreflector in that the reflected light is substantially parallel to the incident light. The desired location of the target 118 is somewhere along the first and second edges 102, 104 or another reference position. The housing 12 is rotated so that the photodetector 114 is generally facing the target 118.

The laser beam 42 is projected towards the target 118 by the laser transmitter 10. The photodetector 114 generates a signal as it detects the laser beam 42 reflected from the target 118. The digital processor 32 monitors the photodetector 114 for the signal. Once the signal is generated, the digital processor 32 determines the position of the pentaprism 48, and thus the base 14, from the optical encoder 116. The optical encoder 116 is calibrated with the reference axis 98 so that all positional information generated by the optical encoder 116 is referenced to the reference axis 98. The digital processor 32 causes the rotating device 30 to rotate the base 14 until the reference axis 98 is substantially parallel with a line defined by the laser transmitter 10 and the target 118. The reference axis 98 is automatically aligned with one of the edges 102, 104 of the jobsite or the reference position so that the predetermined slopes for the plane of the laser light 42 may be set by the operator. Once aligned, the operator may set the desired slopes. The digital processor 32 will calculate the composite slope, pivot the grade arm 26 the calculated number of degrees and rotate the base 14 the required number of degrees so that the plane of light has the desired slopes with the respect to the X-axis 56 and with respect to the Y-axis 58. The laser transmitter 10 is accurately aligned without regard to the skill of the operator or the precise alignment of the optical scope 105.

Figure 5:
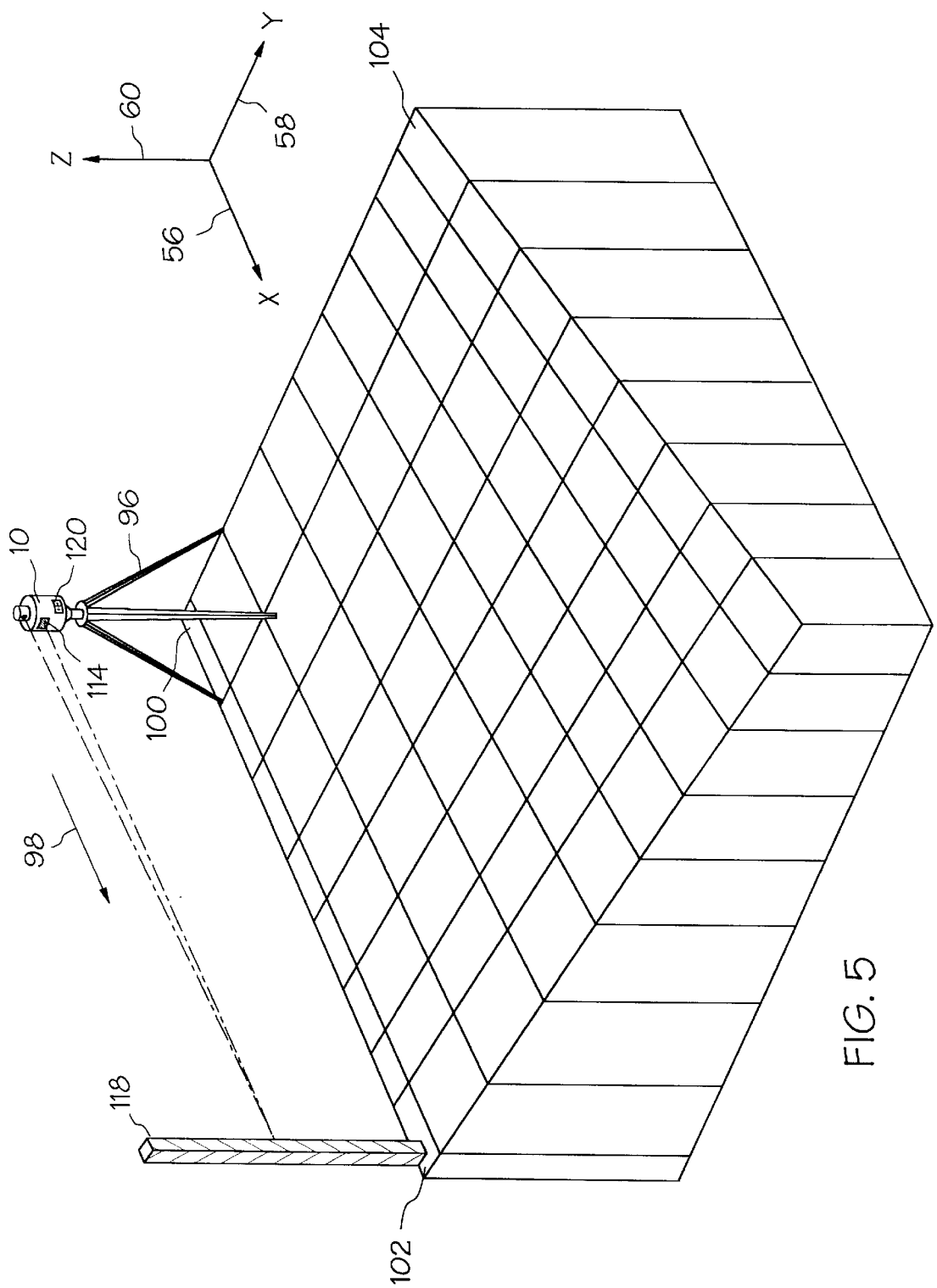
FIG. 5 is a schematic perspective view illustrating a field set-up of the laser transmitter with the self-aligning feature according to another embodiment of the present invention.

According to another embodiment of the present invention, a direction to rotate the laser transmitter 10 may be indicated by a directional indicator 120 as shown in FIGS. 3 and 5. In this embodiment, the base 14 does not have to rotate with respect to the housing 12. The base 14 may be rigidly mounted to the housing 12. Further, the base 14 may be integral with the housing 12 and not necessarily formed of separate and distinct components. Further, the rotating device 30 is not needed as the base 14 rotates with the housing 12. The position measuring device 99 may be coupled to the tripod 96 so that a position of the housing 12, and hence the base 14, may be referenced to the stationary tripod 96. Preferably, the encoder disc 101 is coupled to the housing 12 while the read head 103 is coupled to the tripod 96. Alternatively, the position of the housing 12 may be determined by the photodetecting system 112.

As shown in FIG. 5, the target 118 is positioned along one of the edges 102, 104 of the jobsite or another reference position. The digital processor 32 determines the location of the target 118 from the output of the optical encoder 116 as laser light 42 reflected from the target 118 is detected by the photodetector 114. The digital processor 120 controls the directional indicator 120 to indicate a direction to rotate the base 14 so that the reference axis 98 is substantially parallel with the line defined by the laser transmitter 10 and the target 118. The laser transmitter 10 is properly aligned once the housing 12 is rotated so that the reference axis 98 is substantially parallel with the line defined by the laser transmitter 10 and the target 118. The laser transmitter 10 is accurately aligned without regard to the skill of the operator or the precise alignment of the optical scope 105.

Once the laser transmitter 10 is properly aligned, the operator may then set the desired slopes with respect to the X and Y axes 56, 58. The digital processor 32 will calculate the composite slope and tilt the grade arm 26 accordingly. The directional indicator 120 will indicate the direction to rotate the housing 12, and hence the base 14, based on the calculation performed by the digital processor 32. The processor 32 will monitor the position measuring device 99 until the housing 12 has been rotated the set number of degrees.

Alternatively, the processor may monitor the photodetecting system 112 in order to determine the number of degrees that the housing 12 has been rotated. Once the laser transmitter 10 is aligned, the processor 32 has a fixed frame of reference as the reference axis 98 is aligned with one edge of the jobsite. As the housing 12 is manually rotated, the output from the optical encoder 116 will indicate the number of degrees the exit opening 48a of the pentaprism 48 has shifted from its aligned positioned. Accordingly, the processor 32 may determine the number of degrees in which the housing 12 has been rotated. It should be apparent that the processor 32 will be able to determine the number of degrees in which the housing has been rotated as long as the photodetector 114 is able to receive the laser beam 42 reflected from the target 118. Once the base 14 is manually rotated as instructed by the directional indicator 120, the plane of light will have the desired slopes with respect to the X and Y axes 56, 58.

It will be appreciated by those skilled in the art that the photodetector 114 may be mounted within the housing 12. For example, the reflected laser beam 42 may be reflected by the pentaprism 48 to a half-mirror positioned along the first axis. The half-mirror may then reflect the reflected laser beam 42 to the appropriately positioned photodetector 114. While such a photodetecting system requires the proper alignment of the pentaprism 48, the half mirror and the photodetector 114, the photodetector 114 may detect the position of the exit opening 48a of the pentaprism 48 without regard to the position of the housing 12. The photodetector 114 will generate a signal indicative of the detection of reflected light so that the position of the exit opening 48a of the pentaprism 48 may be read from the optical encoder 116. It will be further appreciated by those skilled in the art that the laser beam 42 may be modulated to reduce the interfering effects of ambient light on the photodetecting system 112.

Having described the invention in detail and by reference to preferred embodiments thereof, it will be apparent that modifications and variations are possible without departing from the scope of the invention which is defined in the appended claims.

What is claimed is:

1. An apparatus for projecting laser light in a plane having predetermined slopes with respect to an X-axis and with respect to a Y-axis, said Y-axis being orthogonal to said X-axis, said apparatus comprising:

a housing;

a base rotatably coupled to said housing;

a gimbal mechanism coupled to said base and adapted for pivotal movement about said X-axis;

a frame coupled to said gimbal mechanism and adapted for pivotal movement along said Y-axis;

an optical device coupled to said frame and including a light source to generate said laser light which rotates about a first axis and an optical projecting device to project said laser light in said plane which is orthogonal to said first axis;

an X-axis leveling device coupled to said gimbal mechanism to control an angular orientation of said gimbal mechanism about said X-axis with respect to a Z-axis, said Z-axis being substantially orthogonal to said X and Y axes;

a Y-axis leveling device coupled to said gimbal mechanism and said frame to control an angular orientation of said frame about said Y-axis with respect to said Z-axis;

a grade arm rotatably coupled to said frame and including a first level sensor adapted to sense said angular orientation of said gimbal mechanism and a second level sensor adapted to sense said angular orientation of said frame;

a grade arm pivoting device coupled to said grade arm to control a predetermined angular orientation of said grade arm with respect to one of said X or Y axes;

a rotating device coupled to said base to adjust an angular orientation of said base with respect to a reference axis, said base being rotated about said Z-axis; and a processor programmed to set said predetermined angular orientation of said grade arm and said angular orientation of said base based on said predetermined slopes, said processor adapted to control said X-axis leveling device and said Y-axis leveling device so that said first and second level sensors are substantially level and said plane of light has said predetermined slopes.

2. The apparatus of claim 1, wherein said grade arm is substantially straight.

3. The apparatus of claim 2, wherein said base includes a position measuring device to measure said angular orientation of said base with respect to said reference axis.

4. The apparatus of claim 3, wherein said position measuring device is a rotary encoder.

5. The apparatus of claim 1, further comprising a reflective target that is positioned at a desired location from said apparatus, wherein said optical device includes a photodetecting system to detect said laser light reflected from said reflective target and generate a signal representative of said location, said processor adapted to receive said signal and to control said rotating device so that said reference axis is substantially parallel with a line defined by said apparatus and said target.

6. The apparatus of claim 5, wherein said predetermined slopes are inputted by a user into the processor.

7. The apparatus of claim 5, wherein said photodetecting system includes an optical encoder.

8. The apparatus of claim 5, wherein said reflective target comprises a retroreflector.

9. The apparatus of claim 3, wherein said predetermined slopes are inputted by a user into said processor.

10. The apparatus of claim 1, wherein said base includes a first gearing mechanism, said rotating device includes a second gearing mechanism in engagement with said first gearing mechanism and a motor coupled to said second gearing mechanism.

11. The apparatus of claim 1, wherein said grade arm pivoting device includes a leadscrew nut coupled to said grade arm, a leadscrew threadly engaged with said leadscrew nut, and a motor coupled to said leadscrew.

12. The apparatus of claim 1, wherein a range of rotation of said grade arm is about ±45 degrees.

13. An apparatus for projecting laser light in a plane having predetermined slopes with respect to an X-axis and with respect to a Y-axis, said Y-axis being substantially orthogonal to said X-axis, said apparatus comprising:
   a base;
   a gimbal mechanism coupled to said base and adapted for pivotal movement about said X-axis;
   a frame coupled to said gimbal mechanism and adapted for pivotal movement along said Y-axis;
   an optical device coupled to said frame and including a light source to generate said laser light which rotates about a first axis, an optical projecting device to project said laser light in said plane which is orthogonal to said first axis, and a photodetecting system;
   an X-axis leveling device coupled to said gimbal mechanism to control an angular orientation of said gimbal mechanism about said X-axis with respect to a Z-axis, said Z-axis being substantially orthogonal to said X and Y axes;
   a Y-axis leveling device coupled to said gimbal mechanism and said frame to control an angular orientation of said frame about said Y-axis with respect to said Z-axis;
   a grade arm rotatably coupled to said frame and including a first level sensor adapted to sense said angular orientation of said gimbal mechanism and a second level sensor adapted to sense said angular orientation of said frame;
   a grade arm pivoting device coupled to said grade arm to control a predetermined angular orientation of said grade arm with respect to one of said X or Y axes;
   a reflective target that is positioned at a desired location from said apparatus;
   a directional indicator; and
   a processor;
   wherein said photodetecting system detects reflected laser light from said reflective target and generates a signal representative of said location, said processor is adapted to receive said signal and programmed to set said predetermined angular orientation of said grade arm and to control said directional indicator to indicate a direction to rotate said base about said Z-axis so that said plane of light has said predetermined slopes.

14. The apparatus of claim 13, wherein said directional indicator indicates a direction to rotate said base based on said signal so that a reference axis is substantially parallel with a line defined by said apparatus and said target.

15. The apparatus of claim 14, wherein said processor is adapted to control said directional indicator to indicate a direction to rotate said base with respect to said reference axis so that said plane of light has said predetermined slopes.

16. The apparatus of claim 13, wherein said grade arm is substantially straight.

17. The apparatus of claim 13, wherein said predetermined slopes are inputted by a user into the processor.

18. The apparatus of claim 13, wherein said photodetecting system includes an optical encoder.

19. The apparatus of claim 13, wherein said reflective target comprises a retroreflector.

20. The apparatus of claim 13, wherein said grade arm pivoting device includes a leadscrew nut coupled to said grade arm, a leadscrew threadly engaged with said leadscrew nut, and a motor coupled to said leadscrew.

21. The apparatus of claim 13, wherein a range of rotation of said grade arm is about ±45 degrees.

22. An automated process for projecting laser light in a plane having predetermined slopes with respect to an X-axis and with respect to a Y-axis, said Y axis being orthogonal to said X-axis, said process comprising the steps of:
   projecting said laser light from a light source along a first axis;
   directing said laser light along said plane which is orthogonal to said first axis;
   positioning said light source at a first angle with respect to one of said X and Y axes;
   rotating said light source a set number of degrees about a Z-axis with respect to a reference axis, said Z-axis being substantially orthogonal to said X and Y axes; and
   calculating said first angle and said set number of degrees based on said predetermined slopes using a digital processor.

23. The process of claim 22, wherein said predetermined slopes are inputted by a user into said digital processor.

24. The process of claim 22, wherein said step of rotating said light source includes rotating a base with respect to a housing, said housing being coupled to said base, said base being coupled to a gimbal mechanism which is adapted for pivotal movement about said X-axis, said gimbal mechanism being coupled to a frame which is adapted for pivotal movement about said Y-axis, and said light source being coupled to said frame.

25. The process of claim 24, wherein said step of rotating said light source includes using a rotary encoder to measure said set number of degrees from said reference axis.

26. The process of claim 24, wherein said step of positioning said light source includes tilting a grade arm which is rotatably coupled to said light source to said first angle, said grade arm including a first level sensor adapted to sense an angular orientation of said light source about said X-axis with respect to said Z-axis and a second level sensor adapted to sense an angular orientation of said light source about said Y-axis with respect to said Z-axis, said position of said light source being adjusted so that said first and second level sensors are substantially level and said plane of light has said predetermined slopes.

27. The process of claim 26, wherein said grade arm is substantially straight.

28. A process for projecting laser light in a plane having predetermined slopes with respect to an X-axis and with respect to a Y-axis, said Y-axis being orthogonal to said X-axis, said process comprising the steps of:

projecting said laser light from a light source along a first axis;

directing said laser light along said plane which is orthogonal to said first axis;

positioning a reflective target at a desired location;

detecting laser light reflected from said reflective target and generating a signal representative of said location; and positioning said light source so that said plane of light has said predetermined slopes.

29. The process of claim 28, wherein said step of positioning said light source includes rotating said light source based on said signal so that a reference axis is substantially parallel with a line defined by said light source and said target.

30. The process of claim 29, wherein said step of positioning said light source includes positioning said light source at a first angle with respect to one of said X and Y axes.

31. The process of claim 30, wherein said step of positioning said light source at said first angle with respect to one of said X and Y axes includes tilting a grade arm which is rotatably coupled to said light source at said first angle, said grade arm including a first level sensor adapted to sense an angular orientation of said light source about said X-axis with respect to a Z-axis and a second level sensor adapted to sense an angular orientation of said light source about said Y-axis with respect to said Z-axis, said Z-axis being substantially orthogonal to said X and Y axes, said position of said light source is adjusted so that said first and second level sensors are substantially level and said plane of light has said predetermined slopes.

32. The process of claim 30, wherein said step of positioning said light source includes rotating a base a set number of degrees about said Z-axis with respect to said reference axis, said base being coupled to a gimbal mechanism which is adapted for pivotal movement about said X-axis, said gimbal mechanism being coupled to a frame which is adapted for pivotal movement about said Y-axis, and said light source being coupled to said frame.

33. The process of claim 31, wherein said grade arm is substantially straight.

34. A process for projecting laser light in a plane having predetermined slopes with respect to an X-axis and with respect to a Y-axis, said Y-axis being orthogonal to said X-axis, said process comprising the steps of:

projecting said laser light from a light source along a first axis;

directing said laser light along said plane which is orthogonal to said first axis;

positioning a reflective target at a desired location;

detecting laser light reflected from said reflective target and generating a signal representative of said location;

positioning said light source at a first angle with respect to one of said X and Y axes;

indicating a direction to rotate said light source, said light source being rotated about a Z-axis, said Z-axis being substantially orthogonal to said X and Y axes; and calculating said first angle and said direction so that said plane of laser light has said predetermined slopes.

35. The process of claim 34, wherein said step of indicating a direction to rotate said light source includes indicating a direction to rotate said light source based on said signal so that a reference axis is substantially parallel with a line defined by said apparatus and said target.

36. The process of claim 35, wherein said step of indicating a direction to rotate said light source includes indicating a direction to rotate said light source with respect to said reference axis so that said plane of light has said predetermined slopes.

37. The process of claim 36, wherein said step of indicating a direction to rotate said light source includes rotating a base, said base being coupled to a gimbal mechanism which is adapted for pivotal movement about said X-axis, said gimbal mechanism being coupled to a frame which is adapted for pivotal movement about said Y-axis, and said light source being coupled to said frame.

38. The process of claim 36, wherein said step of positioning said light source includes tilting a grade arm which is rotatably coupled to said light source at said first angle, said grade arm including a first level sensor adapted to sense an angular orientation of said light source about said X-axis with respect to said Z-axis and a second level sensor adapted to sense an angular orientation of said light source about said Y-axis with respect to said Z-axis, said position of said light source being adjusted so that said first and second level sensors are substantially level and said plane of light has said predetermined slopes.

39. The process of claim 38, wherein said grade arm is substantially straight.

* * * * *